United States Patent Office 2,883,300
Patented Apr. 21, 1959

2,883,300

AQUEOUS COATING COMPOSITION OF COAL ACIDS, STARCH AND A PLASTICIZER AND A BASE COATED THEREWITH

Herbert B. Rickert, Midland, Mich., assignor to The Dow Chemical Company, Midland, Mich., a corporation of Delaware No Drawing. Application April 12, 1957
Serial No. 652,380

8 Claims. (Cl. 106—213)

This invention concerns aqueous coal acids and starch coating compositions and substrates coated therewith. More particularly, it concerns plasticized aqueous coal acids-starch coating compositions which are useful at very low humidities.

Aqueous coal acids-starch coating compositions and substrates coated therewith have been disclosed in U.S. patent application Serial No. 642,683, filed February 27, 1957. Such coating compositions are more useful at higher humidities than aqueous coal acids coating compositions containing no starch. However, the starch modified coal acids coatings give relatively brittle films at low humidities.

In accordance with this invention, it has now been discovered that aqueous coal acids-starch coating compositions can be modified by the addition of a water-soluble liquid polyhydric alcohol or a water-soluble liquid polyalkylene glycol which acts as a plasticizer, to provide coating compositions which give dry films useful even at zero percent relative humidity. In contrast thereto, coal acids-starch coatings containing no polyhydric alcohol or polyalkylene glycol plasticizer are brittle at 0 to 15 percent relative humidities.

The coating compositions of this invention deposit films which provide inexpensive protection against marring. The deposited films resist attack by non-polar organic solvents, i.e., they are not dissolved thereby. The films are water-soluble, however, and can be removed by water wash. By starch, as used hereinafter, is meant a starch of the group including natural starches, such as potato, corn, and wheat starches, oxidized starches, and dextrinized starches, commonly called dextrins. As used in the coating compositions of this invention, the starch is in gelatinized form. The coal acids referred to in this patent application are prepared in conventional ways, as described in copending U.S. Patent application Serial No. 633,695, filed January 11, 1957.

The coal acids-starch-plasticizer coatings of this invention are applied as aqueous compositions containing a maximum of between 33 and 75 percent by weight of binder solids (coal acids and starch), depending upon the starch content, the balance being water-soluble liquid polyhydric alcohol or polyalkylene glycol, and water. The coal acids content is variable between 10 and 90 percent by weight of the binder solids while the starch content is variable between 90 and 10 percent thereof. The polyhydric alcohol or polyalkylene glycol content is variable between about 10 and 50 percent by weight of the binder solids. The preferred range of proportions of ingredients of the coating compositions of this invention, on a weight basis, is as follows:

Coal acids _____ 50–80% of binder solids.
Starch _____ 50–20% of binder solids.
Polyhydric alcohol
 or polyalkylene
 glycol _____ 10–30% of weight of binder solids.
Water _____ In sufficient amount to give the desired consistency for the desired method of application.

The preferred minimum water content ranges between about 50 percent by weight of the binder solids when starch constitutes 10 percent of the binder solids, and about 300 percent when starch constitutes 90 percent of the binder solids.

Representative of the water soluble liquid polyhydric alcohols and polyalkylene glycols used in the practice of this invention are the glycols, such as ethylene, propylene, butylene, amylene, and hexylene glycols; glycerine; polyethylene glycols, inclusive of diethylene glycol and polyethylene glycols up to a molecuar weight of 600; and polypropylene glycols, inclusive of dipropylene glycol and polypropylene glycols up to a molecuar weight of 400; and mixtures thereof.

In practice, a pre-gelatinized starch as such or as an aqueous dispersion can be mixed together with an aqueous coal acids solution, a plasticizer of the type indicated, and water as desired, to make the coating compositions of this invention. Alternatively, the ingredients, including a raw starch, can be mixed together and boiled for a time sufficient to gelatinize the starch. The order of addition of ingredients or cooking of the starch is not important. On cooling, the coating compositions are ready for use.

The aqueous coal acids-starch-plasticizer coating compositions of this invention can be applied in various ways, such as by brushing, spraying, dipping and the like, as desired, depending upon the consistency of the coating composition. The coatings are applied to substrates which are not harmed by or are not reactive with their ingredients. Smooth substrates, such as glass, plastics, aluminum and the like, or porous substrates, particularly of cellulosic materials, for which a higher viscosity coating composition is used sufficient to give a continuous film thereon, are representative.

The coating compositions are dried by evaporating water, advantageously at room temperature or thereabout. The coating compositions of this invention are useful at relative humidities between 0 and 85 percent to give clear, smooth, nontacky, fungus-resistant films having good adhesion. Such films are not dissolved by non-polar organic solvents, but can be removed by washing with water.

The following examples show ways in which the invention has been practiced. Where given, percentages are by weight.

Example I

The following formulation was mixed together, boiled for 24 minutes, and cooled to room temperature:

| | Grams |
|---|---|
| 50% aqueous solution of coal acids | 200 |
| Potato starch | 60 |
| Polyethylene glycol, molecular weight 200 | 30 |
| Water | 100 |

Films of this formulation were coated on several glass plates, dried at room temperature, and conditioned at 14 percent relative humidity. The dried films varied from 10 mils. to 12 mils. in thickness, and had a Sward hardness of 18 as determined by the Sward hardness rocker, described in the 4-page instruction pamphlet issued by the manufacturer, H. S. Gardner Company, dated December, 1948.

Example II

The following formulation was mixed together, boiled for 10 minutes, and cooled to room temperature:

| | Grams |
|---|---|
| 50% aqueous solution of coal acids | 20 |
| 1,3-butylene glycol | 2.5 |
| Potato starch | 5 |
| Water | 30 |

Films of this formulation were coated on four glass plates, dried at room temperature, and placed in controlled humidity chambers. After conditioning at the indicated humidities for 24 hours, the films had the following characteristics:

| Rel. Humidity, Percent | Adhesion | Film Clarity | Thickness, Mils. | State |
|---|---|---|---|---|
| 76 | good | clear | 1 | smooth, non-tacky. |
| 51 | do | do | 1 | Do. |
| 20 | very good | do | 1 | Do. |
| 0 | do | do | 3 | Do. |

The dried films were removable by a water wash.

Example III

The following formulation waas boiled for 10 minutes and cooled to room temperature:

| | Grams |
|---|---|
| 50% aqueous solution of coal acids | 20 |
| Polyethylene glycol, molecular weight 200 | 2.5 |
| Potato starch | 10 |
| Water | 30 |

The resulting formulation was used to coat the bottom of a 90 mm. Petri dish. The coating was then inoculated with 1 ml. of an aqueous suspension containing the 5 fungi *Aspergillus terreus, Aspergillus niger, Rhizopus nigricans, Penicillium chrysogenuns, Candida pelliculosa.* After 2 months' incubation at 30° C. and 80 percent relative humidity, there was no sign of any fungal attack. Under the same conditions, a control of potato starch showed fugal attack within five days.

Example IV

A quantity of 99.2 g. of 2 percent cooked potato starch-water dispersion was mixed with 0.4 g. of an aqueous 50 percent filtered coal acids solution and 0.4 g. of tripropylene glycol. The resulting composition was used to coat a glass plate. When dried at 36 percent relative humidity, a clear, hard film resulted.

Example V

The following formulation was mixed, boiled for 10 minutes and cooled to room temperature:

| | Grams |
|---|---|
| 50 percent aqueous coal acids solution | 36 |
| Corn starch | 2 |
| Polyethylene glycol, molecular weight 200 | 2.5 |

A coating thereof was applied to a polystyrene sheet and dried at zero percent relative humidity. A clear, smooth film resulted.

Example VI

The following formulation was mixed, boiled for 10 minutes and cooled to room temperature:

| | Grams |
|---|---|
| 50 percent aqueous coal acids solution | 2 |
| Wheat starch | 9 |
| Water | 150 |
| Polyethylene glycol, molecular weight 200 | 2.5 |

A coating thereof was applied to a polystyrene sheet. When dried at 20 percent relative humidity, a clear, smooth film resulted.

Example VII

A series of 6 formulations was made up by boiling the following mixtures for 10 minutes.

| | Grams |
|---|---|
| 50 percent aqueous coal acids solution | 20 |
| Potato starch | 5 |
| Water | 30 |

Plasticizer (polyhydric alcohol or polyalkylene glycol), 1.0–5.0 g., as follows:

1. Ethylene glycol, 600 mol. wt. — 2.5 and Glycerine — 2.5
2. 1,2-propylene glycol — 2.5
3. Tripropylene glyocl — 2.5
4. 1,3-butylene glycol — 2.5
5. 1,6-hexylene glycol — 2.5
6. Ethylene glycol — 1.0

A film of each formulation was cast on a glass plate and dried at room temperature at the relative humidities indicated below. The films corresponding to the numbered plasticizers had properties as follows:

| Film | 0% R.H. | 20% R.H. | 50% R.H. | 76% R.H. |
|---|---|---|---|---|
| 1 | dry and smooth. | dry and smooth. | dry and smooth. | dry and smooth. |
| 2 | do | do | do | Do. |
| 3 | do | do | do | Do. |
| 4 | do | do | do | Do. |
| 5 | do | do | do | Do. |
| 6 | dry and cracked. | do | do | Do. |

What is claimed is:

1. An aqueous coating composition the film forming binder of which consists of a mixture of coal acids and a starch, the coal acids content ranging between 10 and 90 percent by weight of the binder solids and the starch content ranging between 90 and 10 percent of the binder solids, said binder solids being plasticized with between 10 and 50 percent of their weight with a plasticizer which is a water-soluble liquid polyhydric compound of the group consisting of polyhydric alcohols and polyalkylene glycols and having water in amount sufficient to give a desired consistency, the starch being in gelatinized form.

2. The composition of claim 1, wherein the coal acids content ranges between 50 and 80 percent by weight of the binder solids, the starch ranges between 50 and 20 percent of the binder solids and the plasticizer ranges between 10 and 30 percent of the binder solids by weight.

3. The composition of claim 1, wherein the plasticizer is ethylene glycol.

4. The comparison of claim 1, wherein the plasticizer is 1,3-butylene glycol.

5. The composition of claim 1, wherein the plasticizer is 1,6-hexylene glycol.

6. The composition of claim 1, wherein the plasticizer is tripropylene glycol.

7. The composition of claim 1, wherein the plasticizer is a mixture of glycerin and polyethylene glycol having a molecular weight of 200.

8. A base coated with the composition of claim 1.

References Cited in the file of this patent

UNITED STATES PATENTS

| 2,093,450 | Jacobson | Sept. 21, 1937 |
| 2,414,074 | Vitalis | Jan. 7, 1947 |
| 2,435,901 | Peters | Feb. 10, 1948 |

FOREIGN PATENTS

| 1,120,163 | France | July 2, 1956 |
| 746,486 | Great Britain | Mar. 14, 1956 |